US008099378B2

(12) United States Patent
Keith, Jr.

(10) Patent No.: US 8,099,378 B2
(45) Date of Patent: *Jan. 17, 2012

(54) SECURE VIRTUAL PRIVATE NETWORK UTILIZING A DIAGNOSTICS POLICY AND DIAGNOSTICS ENGINE TO ESTABLISH A SECURE NETWORK CONNECTION

(75) Inventor: Robert O. Keith, Jr., Modesto, CA (US)

(73) Assignee: MaxSP Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/916,438

(22) Filed: Oct. 29, 2010

(65) Prior Publication Data

US 2011/0047118 A1 Feb. 24, 2011

Related U.S. Application Data

(63) Continuation of application No. 11/525,728, filed on Sep. 22, 2006, now Pat. No. 7,840,514.

(51) Int. Cl.
*G06F 17/00* (2006.01)
*G06N 5/02* (2006.01)
(52) U.S. Cl. ....................................... 706/47
(58) Field of Classification Search ...................... 706/47
See application file for complete search history.

(56) References Cited

U.S. PATENT DOCUMENTS

| 4,870,704 A | 9/1989 | Leete |
| 5,602,990 A | 2/1997 | Leete |
| 5,649,196 A | 7/1997 | Woodhill et al. |
| 5,659,743 A | 8/1997 | Adams et al. |
| 5,787,409 A | 7/1998 | Seiffert et al. |
| 5,802,364 A | 9/1998 | Senator |
| 5,812,751 A | 9/1998 | Ekrot |
| 5,835,911 A | 11/1998 | Nakagawa et al. |
| 5,897,635 A | 4/1999 | Torres et al. |
| 5,933,647 A | 8/1999 | Aronberg |
| 5,950,010 A | 9/1999 | Hesse et al. |
| 5,974,547 A | 10/1999 | Klimenko |
| 6,012,152 A | 1/2000 | Douik et al. |
| 6,029,196 A | 2/2000 | Lenz |
| 6,067,582 A | 5/2000 | Smith et al. |

(Continued)

OTHER PUBLICATIONS

Cisco PIX "Configuring an IPSec Tunnel Between a Cisco Secure PIX Firewall and a Checkpoint NG Firewall", May 12, 2006, document ID 23785.*

(Continued)

*Primary Examiner* — Jeffrey A Gaffin
*Assistant Examiner* — Li-Wu Chang
(74) *Attorney, Agent, or Firm* — Haverstock & Owens LLP

(57) ABSTRACT

A secure virtual private network (VPN) is described herein. The secure VPN implements standard VPN software with diagnostics to ensure a client device coupling to the VPN is secure. The diagnostics include a policy, a library and an engine where the policy determines what the requirements are for permitting the client device to couple to the VPN. The library stores programs for checking if the client device has any problems. The engine gathers information related to the client device and executes the programs stored within the library. When a user attempts to couple to the VPN with a client device, the server initiates the policy, library and engine to check for issues, and then the user is informed of the issues and/or a mechanism automatically fixes the issues. After the client device is verified as secure, it is able to couple to the VPN for data transfers.

48 Claims, 6 Drawing Sheets

U.S. PATENT DOCUMENTS

| | | | |
|---|---|---|---|
| 6,144,959 A | 11/2000 | Anderson et al. |
| 6,170,065 B1 | 1/2001 | Kobata et al. |
| 6,189,101 B1 | 2/2001 | Dusenbury, Jr. |
| 6,209,089 B1 | 3/2001 | Selitrennikoff et al. |
| 6,212,660 B1 | 4/2001 | Joeressen et al. |
| 6,282,711 B1 | 8/2001 | Halpern et al. |
| 6,301,612 B1 | 10/2001 | Selitrennikoff et al. |
| 6,317,761 B1 | 11/2001 | Landsman et al. |
| 6,349,137 B1 | 2/2002 | Hunt et al. |
| 6,356,915 B1 | 3/2002 | Chtchetkine et al. |
| 6,363,400 B1 | 3/2002 | Chtchetkine et al. |
| 6,366,296 B1 | 4/2002 | Boreczky et al. |
| 6,378,035 B1 | 4/2002 | Parry et al. |
| 6,421,777 B1 | 7/2002 | Pierre-Louis et al. |
| 6,449,658 B1 | 9/2002 | Lafe et al. |
| 6,459,499 B1 | 10/2002 | Tomat |
| 6,463,530 B1 | 10/2002 | Sposato |
| 6,473,794 B1 | 10/2002 | Guheen et al. |
| 6,477,531 B1 | 11/2002 | Sullivan et al. |
| 6,490,677 B1 | 12/2002 | Aguilar et al. |
| 6,536,037 B1 | 3/2003 | Guheen et al. |
| 6,553,375 B1 | 4/2003 | Huang et al. |
| 6,556,950 B1 | 4/2003 | Schwenke et al. |
| 6,606,744 B1 | 8/2003 | Mikurak |
| 6,625,651 B1 | 9/2003 | Swartz et al. |
| 6,625,754 B1 | 9/2003 | Aguilar et al. |
| 6,636,857 B2 | 10/2003 | Thomas et al. |
| 6,654,797 B1 | 11/2003 | Kamper |
| 6,654,801 B2 | 11/2003 | Mann et al. |
| 6,694,375 B1 | 2/2004 | Beddus et al. |
| 6,697,852 B1 | 2/2004 | Ryu |
| 6,704,886 B1 | 3/2004 | Gill et al. |
| 6,718,464 B2 | 4/2004 | Cromer et al. |
| 6,728,530 B1 | 4/2004 | Heinonen et al. |
| 6,735,625 B1 | 5/2004 | Ponna |
| 6,751,658 B1 | 6/2004 | Haun et al. |
| 6,757,729 B1 | 6/2004 | Devarakonda et al. |
| 6,816,462 B1 | 11/2004 | Booth, III et al. |
| 6,816,882 B1 | 11/2004 | Conner et al. |
| 6,871,210 B1 | 3/2005 | Subramanian |
| 6,880,108 B1 | 4/2005 | Gusler et al. |
| 6,885,481 B1 | 4/2005 | Dawe |
| 6,886,020 B1 | 4/2005 | Zahavi et al. |
| 6,915,343 B1 | 7/2005 | Brewer et al. |
| 6,954,853 B2 | 10/2005 | Wang |
| 6,954,930 B2 | 10/2005 | Drake et al. |
| 6,959,235 B1 | 10/2005 | Abdel-Malek et al. |
| 6,985,967 B1 | 1/2006 | Hipp |
| 7,003,560 B1 | 2/2006 | Mullen et al. |
| 7,003,663 B2 | 2/2006 | Lagosanto et al. |
| 7,058,698 B2 | 6/2006 | Chatterjee et al. |
| 7,080,118 B2 | 7/2006 | Hildebrand |
| 7,143,307 B1 | 11/2006 | Witte et al. |
| 7,149,698 B2 | 12/2006 | Guheen et al. |
| 7,175,078 B2 | 2/2007 | Ban et al. |
| 7,178,166 B1 * | 2/2007 | Taylor et al. ............. 726/25 |
| 7,194,445 B2 | 3/2007 | Chan et al. |
| 7,200,779 B1 | 4/2007 | Coss, Jr. et al. |
| 7,210,143 B2 | 4/2007 | Or et al. |
| 7,237,122 B2 | 6/2007 | Kadam et al. |
| 7,287,053 B2 | 10/2007 | Bodin |
| 7,328,367 B2 | 2/2008 | Ukai et al. |
| 7,337,311 B2 | 2/2008 | Chen et al. |
| 7,392,046 B2 | 6/2008 | Leib et al. |
| 7,401,125 B1 | 7/2008 | Uchida et al. |
| 7,480,822 B1 | 1/2009 | Arbon et al. |
| 7,512,584 B2 | 3/2009 | Keith |
| 7,627,694 B2 | 12/2009 | Streenivasan et al. |
| 7,698,487 B2 | 4/2010 | Rothman et al. |
| 7,788,524 B2 | 8/2010 | Wing et al. |
| 2001/0037323 A1 | 11/2001 | Moulton et al. |
| 2001/0049793 A1 | 12/2001 | Sugimoto |
| 2002/0013827 A1 | 1/2002 | Edstrom et al. |
| 2002/0035674 A1 | 3/2002 | Vetrivelkumaran et al. |
| 2002/0049764 A1 | 4/2002 | Boothby et al. |
| 2002/0083183 A1 | 6/2002 | Pujare et al. |
| 2002/0087625 A1 | 7/2002 | Toll et al. |
| 2002/0087963 A1 | 7/2002 | Eylon et al. |
| 2002/0091763 A1 | 7/2002 | Shah et al. |
| 2002/0094868 A1 | 7/2002 | Tuck |
| 2002/0104080 A1 | 8/2002 | Woodard et al. |
| 2002/0107920 A1 | 8/2002 | Hotti |
| 2002/0116585 A1 | 8/2002 | Scherr |
| 2002/0124092 A1 | 9/2002 | Urien |
| 2002/0138640 A1 | 9/2002 | Raz |
| 2002/0157089 A1 | 10/2002 | Patel et al. |
| 2002/0161868 A1 | 10/2002 | Paul et al. |
| 2002/0188941 A1 | 12/2002 | Cicciarelli et al. |
| 2003/0005096 A1 | 1/2003 | Paul et al. |
| 2003/0033379 A1 | 2/2003 | Civanlar et al. |
| 2003/0036882 A1 | 2/2003 | Harper et al. |
| 2003/0037328 A1 | 2/2003 | Cicciarelli et al. |
| 2003/0041136 A1 | 2/2003 | Cheline et al. |
| 2003/0046371 A1 | 3/2003 | Falkner |
| 2003/0051128 A1 | 3/2003 | Rodriguez et al. |
| 2003/0055878 A1 | 3/2003 | Fletcher et al. |
| 2003/0078960 A1 | 4/2003 | Murren et al. |
| 2003/0110188 A1 | 6/2003 | Howard et al. |
| 2003/0126242 A1 | 7/2003 | Chang |
| 2003/0191730 A1 | 10/2003 | Adkins et al. |
| 2003/0204562 A1 | 10/2003 | Hwang |
| 2003/0233383 A1 | 12/2003 | Koskimies |
| 2003/0233493 A1 | 12/2003 | Boldon et al. |
| 2004/0010716 A1 | 1/2004 | Childress |
| 2004/0068554 A1 | 4/2004 | Bales et al. |
| 2004/0073787 A1 | 4/2004 | Ban et al. |
| 2004/0093492 A1 | 5/2004 | Daude et al. |
| 2004/0104927 A1 | 6/2004 | Husain et al. |
| 2004/0107273 A1 | 6/2004 | Biran et al. |
| 2004/0123153 A1 | 6/2004 | Wright et al. |
| 2004/0148306 A1 | 7/2004 | Moulton et al. |
| 2004/0180721 A1 | 9/2004 | Rowe |
| 2004/0193876 A1 | 9/2004 | Donley |
| 2004/0201604 A1 | 10/2004 | Kraenzel et al. |
| 2004/0236843 A1 | 11/2004 | Wing et al. |
| 2004/0243928 A1 | 12/2004 | Hesmer et al. |
| 2005/0027846 A1 | 2/2005 | Wolfe et al. |
| 2005/0033808 A1 | 2/2005 | Cheng et al. |
| 2005/0044197 A1 | 2/2005 | Lai |
| 2005/0044544 A1 | 2/2005 | Slivka et al. |
| 2005/0108297 A1 | 5/2005 | Rollin et al. |
| 2005/0108546 A1 | 5/2005 | Lehew et al. |
| 2005/0108593 A1 | 5/2005 | Purushothaman et al. |
| 2005/0144218 A1 | 6/2005 | Heintz |
| 2005/0149729 A1 | 7/2005 | Zimmer et al. |
| 2005/0160289 A1 | 7/2005 | Shay |
| 2005/0193245 A1 | 9/2005 | Hayden et al. |
| 2005/0198196 A1 | 9/2005 | Bohn et al. |
| 2005/0216524 A1 | 9/2005 | Gomes et al. |
| 2005/0216902 A1 | 9/2005 | Schaefer |
| 2005/0256952 A1 | 11/2005 | Mouhanna et al. |
| 2005/0262503 A1 | 11/2005 | Kane |
| 2005/0268145 A1 | 12/2005 | Hufferd et al. |
| 2005/0273486 A1 | 12/2005 | Keith |
| 2005/0283606 A1 | 12/2005 | Williams |
| 2006/0021040 A1 | 1/2006 | Boulanger et al. |
| 2006/0031377 A1 | 2/2006 | Ng et al. |
| 2006/0031407 A1 * | 2/2006 | Dispensa et al. ............. 709/219 |
| 2006/0031529 A1 | 2/2006 | Keith |
| 2006/0041641 A1 | 2/2006 | Breiter et al. |
| 2006/0041759 A1 * | 2/2006 | Kaliski et al. ............. 713/184 |
| 2006/0047716 A1 | 3/2006 | Keith |
| 2006/0047946 A1 | 3/2006 | Keith |
| 2006/0074943 A1 | 4/2006 | Nakano et al. |
| 2006/0095705 A1 | 5/2006 | Wichelman et al. |
| 2006/0129459 A1 | 6/2006 | Mendelsohn |
| 2006/0143709 A1 | 6/2006 | Brooks et al. |
| 2006/0179061 A1 | 8/2006 | D'Souza et al. |
| 2006/0224544 A1 | 10/2006 | Keith |
| 2006/0224545 A1 | 10/2006 | Keith |
| 2006/0233310 A1 | 10/2006 | Adams, Jr. et al. |
| 2007/0078982 A1 | 4/2007 | Aidun et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0185936 A1 | 8/2007 | Derk et al. |
| 2007/0233633 A1 | 10/2007 | Keith |

| | | |
|---|---|---|
| 2007/0239905 A1 | 10/2007 | Banerjee et al. |
| 2007/0271290 A1 | 11/2007 | Keith |
| 2007/0271428 A1 | 11/2007 | Atluri |
| 2007/0274315 A1 | 11/2007 | Keith |
| 2007/0276836 A1 | 11/2007 | Chatterjee et al. |
| 2008/0034019 A1 | 2/2008 | Cisler |
| 2008/0034071 A1 | 2/2008 | Wilkinson et al. |
| 2008/0077622 A1 | 3/2008 | Keith |
| 2008/0077630 A1 | 3/2008 | Keith |
| 2008/0209142 A1 | 8/2008 | Obernuefemann |
| 2008/0216168 A1 | 9/2008 | Larson et al. |
| 2008/0294860 A1 | 11/2008 | Stakutis et al. |
| 2008/0313632 A1 | 12/2008 | Kumar et al. |
| 2009/0094362 A1 | 4/2009 | Huff |
| 2010/0050011 A1 | 2/2010 | Takamoto et al. |

OTHER PUBLICATIONS

Yu et al. "Scalable network resource management for large scale Virtual Private Networks", Simulation Modeling Practice and Theory 12 (2004) pp. 263-285.*

Microsoft Press, Microsoft® Computer Dictionary, Fifth Edition, May 1, 2002, p. 39.

Definition of Plug-in (computing) from http:/en.wikipedia.org/wiki/Plug-in_(computing), printed Jun. 18, 2011, 1 page.

Random House Unabridged Dictionary, "device: meaning and definitions," 1997, Random House Inc., retrieved via "http://dictionary.infoplease.com/device."

Multhitacharoen et al., "A Low-bandwidth Network File System," MIT Laboratory for Computer Science and NYU Department of Computer Science, 2001, 14 pages.

Tridgell, A., "Efficient Algorithms for Sorting and Synchronization," Thesis, The Australian National University, Feb. 1999, 106 pages.

MacDonald, J.P., "File System Support for Delta Compression," University of California at Berkeley, Dept. of Electrical Engineering and Computer Sciences, May 19, 2000, 32 pages.

IBM Corporation, AFS: "User Guide," First Edition, Version 3.6, Apr. 2000, 112 pages.

Shepler et al., "RFC 3530—Network File System (NFS) version 4 Protocol," Standards Track, Apr. 2003, 278 pages, http://tools.ietf.org/html/rfc3530#page-119.

Bandwidth Capping at Source http://www.24onlinebilling.com/download/whitepapers/Bandwidth%20Capping%20At%20Source.pdf.

IEEE100 The Authoritative Dictionary of IEEE Standards Terms, Seventh Edition, Jan. 2003, 3 pages.

VMware, "VMware Infrastructure Architecture Overview," Jun. 14, 2006, http://www.vmware.com/resource/techresources/, pp. 1-14.

VMware, "Using VMware Infrastructure for Backup and Restore," Oct. 26, 2006, http://www.vmware.com/resource/techresources/, pp. 1-20.

http://www.backup.com.

http://www.swapdrive.com/sdbackup.asp.

Microsoft© Computer Dictionary, Fifth Edition, May 1, 2002.

http://www.macrovision.com/products/flexnet_install/installshield/overview/index.shtml, pp. 1-3.

http://www.stealthbits.com.

http://www.pctools.com/registry-mechanic, pp. 1-8.

http://en.wikipedia.org/wiki/Expert_system, pp. 1-13.

http://macrovision.com/products/flexnet_installshield/installshield/index.shtml, pp. 1-2.

http://www.microsoft.com/technet/prodtechnol/windows2000serv/maintain/featusability/imnnwp.pspx, pp. 1-36.

* cited by examiner

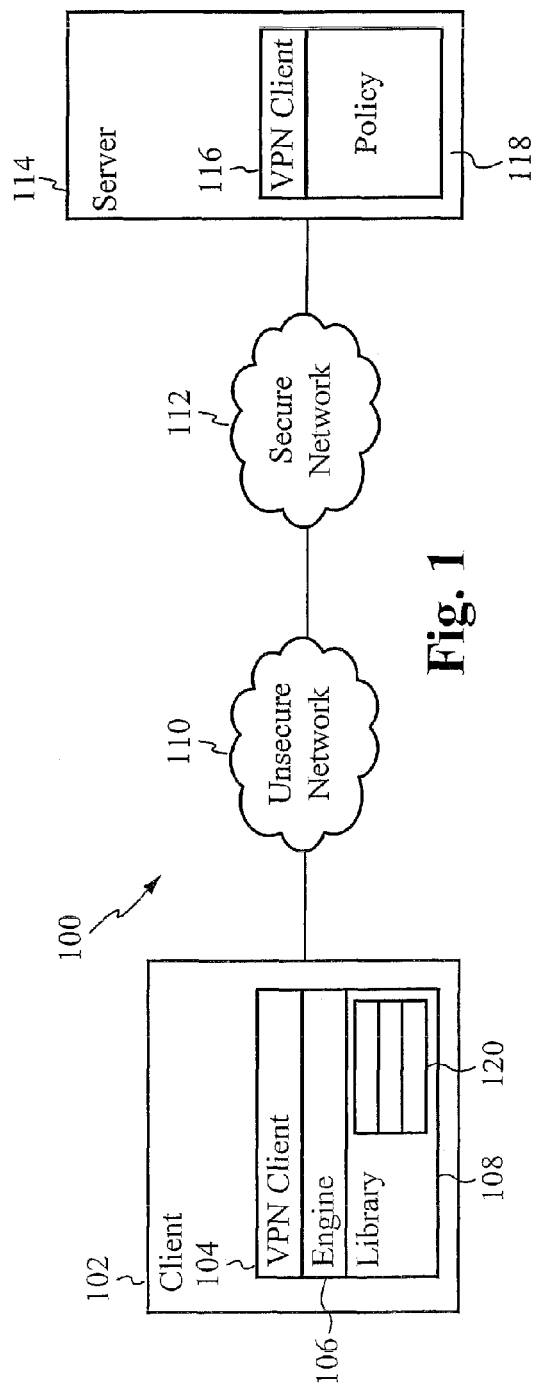

```
<diag>
    <id>5</id>
    <version>1.0</version>
    <date_created>1.0</date_created>
    <date_modified>1.0</date_modified>
    <maxsp_url></maxsp_url>
    <order>3</order>
    <name>Ethernet card errors</name>
    <category>hardware</category>
    <family>Hardware Management</family>
    <repairable>no</repairable>
    <desc_language>English</desc_language>
    <desc>Your ethernet card is reporting errors. This may be due to faulty
        network card, cable or other hardware.
    <remediation>1.  First, replace your ethernet cable or re-seat the
        cables.  2. You may need to replace the ethernet card.
    </remediation>
    <script_lang>max1</script_lang>
    <diag_script>
        let ethers = F$GETWMI('ethport1', 'counters')
        If (ethers > 0)  then
            F$TMPSTOR('ethernet counters', ethers)
            Return 8
        endif
    </diag_script>
    <repair_script></repair_script>
    <platforms>Windows</platforms>
    <dependency></dependency>
    <confidence><confidence>
    <health_index></health_index>
</diag>
```

Fig. 6

SECURE VIRTUAL PRIVATE NETWORK UTILIZING A DIAGNOSTICS POLICY AND DIAGNOSTICS ENGINE TO ESTABLISH A SECURE NETWORK CONNECTION

RELATED APPLICATION(S)

The present application is a continuation of U.S. patent application Ser. No. 11/525,728, filed Sep. 22, 2006, and entitled "SECURE VIRTUAL PRIVATE NETWORK UTILIZING A DIAGNOSTICS POLICY AND DIAGNOSTICS ENGINE TO ESTABLISH A SECURE NETWORK CONNECTION," which is hereby incorporated by reference.

U.S. patent application Ser. No. 11/440,563, filed on May 24, 2006, and entitled "COMPUTER HARDWARE AND SOFTWARE DIAGNOSTIC AND REPORT SYSTEM", U.S. patent application Ser. No. 11/368,214, filed on Mar. 2, 2006, now U.S. Pat. No. 7,512,584, and entitled "COMPUTER HARDWARE AND SOFTWARE DIAGNOSTIC AND REPORT SYSTEM" which claims priority under 35 U.S.C. §119(e) of the co-owned U.S. Provisional Patent Application, Ser. No. 60/658,970, filed Mar. 4, 2005, and entitled "PRE-INSTALL COMPLIANCE AND CENTRAL PROBLEM DISCOVERY SYSTEM" are all hereby incorporated by reference.

The following co-owned, U.S. patent application Ser. No. 11/368,212 filed Mar. 2, 2006, now U.S. Pat. No. 7,624,086, and entitled PRE-INSTALL COMPLIANCE SYSTEM is also incorporated by reference.

FIELD OF THE INVENTION

The present invention relates to the field of networking. More specifically, the present invention relates to the field of providing secure virtual private networks.

BACKGROUND OF THE INVENTION

A Virtual Private Network (VPN) is a private network generally used by companies to transfer data over a public network. VPN packets are transferred over public networks such as the Internet using standard and typically insecure protocols. There are usually two components to a VPN, a secure internal network and an unsecure outside network. Secure networks are also referred to as private networks and unsecure networks are referred to as public networks. A firewall or some sort of security implementation is implemented between the internal network and the outside network to maintain security within the internal network. The firewall seeks to limit access to the internal network to those users with permission.

Attempts have been made to ensure that VPNs are secure. Some secure VPNs use cryptographic tunneling protocols to provide a number of security measures such as confidentiality to prevent snooping, sender authentication to prevent identity spoofing and message integrity to ensure messages are not manipulated. Tunneling allows data which is intended for a private network to be sent through a public network without the nodes of the public network knowing the data belongs to a private network. Tunneling is implemented by encapsulating the private network data and protocol information within public network transmission units so that the private network protocol information appears to be regular data to the public network. When implemented properly, VPNs like these create a relatively secure communication medium over unsecured networks.

Some VPNs rely on users to be secure by implementing spyware and virus scanners. These VPNs even check occasionally whether the spyware and virus scanners have been installed and are very limited in the efforts made to secure the network. However, if a user's device is not properly configured, the entire VPN's security could be compromised.

SUMMARY OF THE INVENTION

A secure virtual private network (VPN) is described herein. The secure VPN implements standard VPN software with diagnostics to ensure a client device coupling to the VPN is secure. The diagnostics include a policy, a library and an engine where the policy determines what the requirements are for permitting the client device to couple to the VPN. The library stores programs for checking if the client device has any problems. The engine gathers information related to the client device and executes the programs stored within the library. When a user attempts to couple to the VPN with a client device, the server initiates the policy, library and engine to check for issues, and then the user is informed of the issues and/or a mechanism automatically fixes the issues. After the client device is verified as secure, it is able to couple to the VPN for data transfers.

In one aspect, a system for providing a secure communications link between a server and a client device comprises a policy stored on the server, a library stored on the client device for storing information and an engine stored on the client device for using the policy and the library to detect and resolve one or more issues on the client device wherein detecting and resolving the one or more issues increases security on a communications link between the server and the client device. The library is an expert system library. The policy is for designating one or more objects to inspect. The policy is for determining the requirements needed to be met for a connection to be established. Information related to the policy is downloaded from the server to the client device. The policy contains groupings of sub-policies. The grouping of sub-policies include virtual private network checks, network checks, hotfix checks and system checks. The client device is a mobile device or a home user device. The information stored within the library includes one or more programs. The one or more programs stored within the library are wrapped in XML. The engine informs a user of the problems if the client device does not pass. The one or more issues discovered by the engine are automatically fixed or the engine optionally assists a user in fixing the issues manually. The client device and the server are coupled over a virtual private network. The communications link between the server and the client device forms a virtual private network.

In another aspect, a system for providing a secure communications link between a server and a client comprises a policy stored on the server wherein the policy is for designating one or more objects to inspect and for determining the requirements needed to be met for a connection to be established between the server and the client device, further wherein the policy is downloaded from the server to the client device, an expert system library stored on the client device for storing one or more programs and an engine stored on the client device for using the policy and the library to detect and resolve one or more issues on the client device wherein detecting and resolving the one or more issues increases security on a communications link between the server and the client device. The client device is a mobile device or a home user device. The one or more programs stored within the library are wrapped in XML. The policy contains groupings of sub-policies. The grouping of sub-policies include virtual private network checks, network checks, hotfix checks and system checks. The engine informs a user of the problems if the client device does not pass. The one or more issues discovered by the engine are automatically fixed or optionally the engine assists in fixing the one or more issues manually. The client device and the server are coupled over a virtual private network. The communications link between the server and the client device forms a virtual private network.

In another aspect, a method of securing a communications link between a server and a client device comprises coupling the client device with the server, establishing a limited network connection between the client device and the server, downloading a policy from the server to the client device, running a diagnostics engine utilizing a library on the client device and establishing a secure network connection if the diagnostics engine completes without any issues. The library is an expert system library. The limited network connection is sufficient to receive the policy. The method further comprises posting a list of issues when the diagnostics engine fails. The method further comprises automatically fixing or optionally assist in manually fixing one or more issues when diagnostics engine fails. Automatically fixing the one or more issues is selected from the group consisting of downloading applications, downloading application updates, downloading patches, running applications and modifying a registry. The method further comprises adding custom tools within the library. Running the diagnostics engine includes checking for network issues and system issues. The communications link between the server and the client device forms a virtual private network.

In yet another aspect, a network of devices for establishing a secure virtual private network comprises a private network containing one or more secure devices, wherein at least one of the one or more secure devices is a server for storing a diagnostics policy and one or more client devices coupled to the private network through a public network, wherein the one or more client devices contain a diagnostics engine and a diagnostics library. Information related to the diagnostics policy is downloaded to the one or more client devices. The one or more client devices are not able to access the private network without being verified using the diagnostics policy, the diagnostics engine and the diagnostics library. The client devices are selected from the group consisting of personal computers, PDAs, cell phones, laptop computers, thin clients or Apple personal computers, mp3 players and gaining consoles. The diagnostics library is an expert system library. The diagnostics policy is for designating one or more objects to inspect. The diagnostics policy is for determining the requirements needed to be met for a connection to be established. The diagnostics policy contains groupings of sub-policies. The grouping of sub-policies include virtual private network checks, network checks, hotfix checks and system checks. The diagnostics library includes one or more programs. The one or more programs stored within the diagnostics library are wrapped in XML. The diagnostics engine informs a user of issues if the client device does not pass. Issues discovered by the diagnostics engine are automatically fixed or optionally the engine assists in fixing the one or more issues manually.

BRIEF DESCRIPTION OF THE DRAWINGS

FIG. 1 illustrates a block diagram representation of the main components of an embodiment of the present invention.

FIG. 2 illustrates a graphical representation of an exemplary policy.

FIG. 6 illustrates an exemplary XML coded version of a data structure for the diagnostics library.

DETAILED DESCRIPTION OF THE PREFERRED EMBODIMENT

Figure 3:
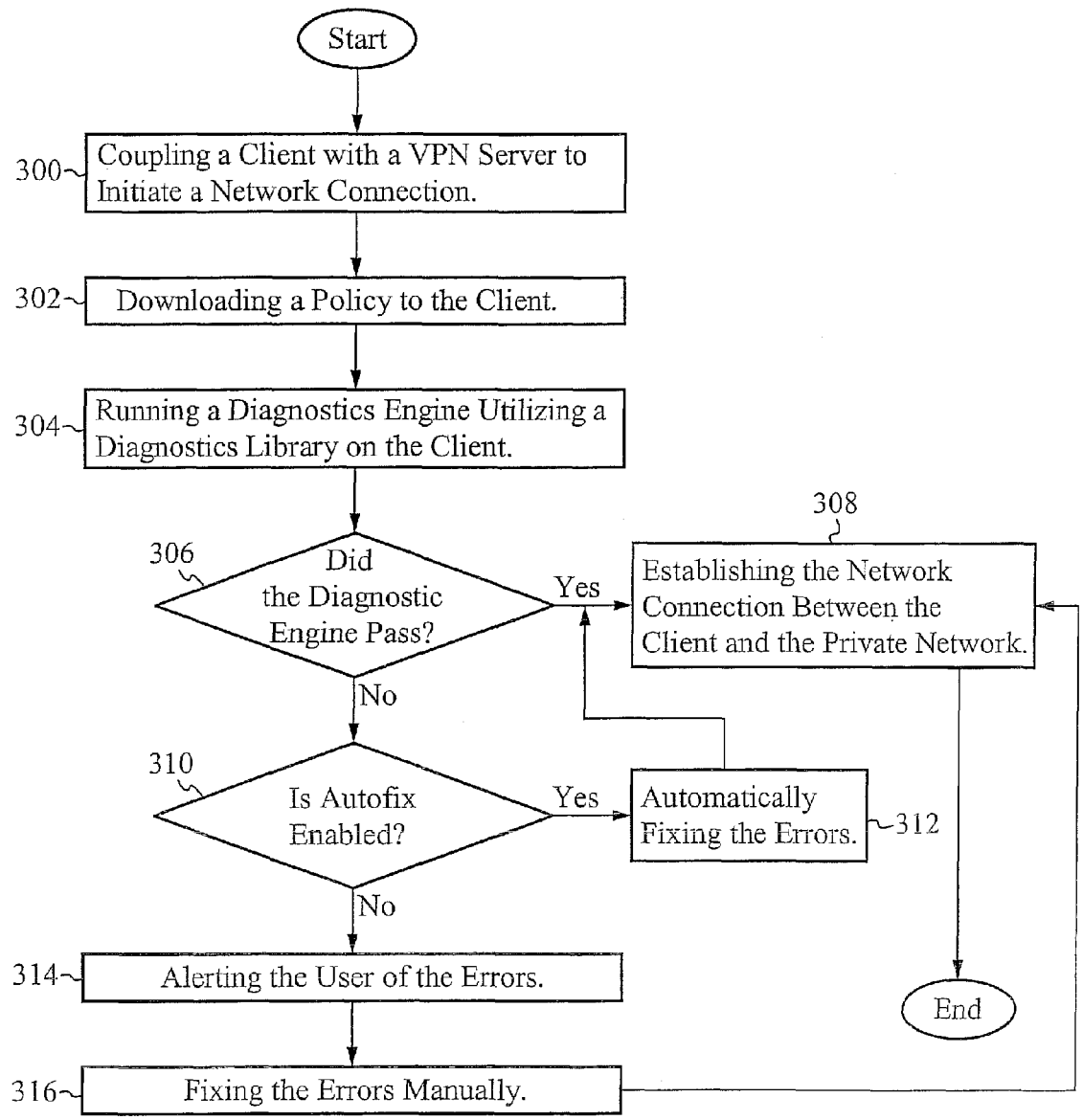
FIG. 3 illustrates a flowchart of steps involved in determining if a client device is secure.

A virtual private network (VPN) with additional security is described herein. The secure VPN implements standard VPN software with added diagnostics to ensure a client device coupling to the VPN is secure. The added diagnostics implement a policy, a library and an engine. The diagnostics policy is stored on a server and determines the required components/configuration for a client device to couple to the VPN. When the client device initiates contact with the server, the diagnostics policy or a representation of the policy such as a code is downloaded to the client device for interaction with the diagnostics engine. The diagnostics engine which is stored on the client device executes one or more programs stored within the diagnostics library according to the diagnostics policy. The diagnostics library which is also stored on the client device stores the programs for checking the client device's status. When a client device attempts to couple to the VPN, the server initiates the policy, library and engine to check for security issues, and then either the user is informed of the issues and manually corrects them or a mechanism automatically fixes the problems. Automatically fixing problems or issues includes, but is not limited to downloading applications, downloading application updates, downloading patches, running applications and modifying a registry. After the client device is verified as secure, it is able to couple to the private/secure network for data transfers.

FIG. 1 illustrates a block diagram representation of the main components of an embodiment of the present invention. A secure VPN 100 allows a client device 102 to couple to a server 114 on a secure network 112 through an unsecure network 110. The secure network 112 is typically a Local Area Network (LAN) utilized by a company wherein only those with the proper credentials such as a login and password are able to access data within the secure network 112. The unsecure network 110 is any network that does not require such security measures to transfer data across the network. The Internet is an example of an unsecure network, although any network that is not secure is an unsecure network. The server 114 stores a VPN Server software 116 and a diagnostics policy 118. The VPN Server software 116 is standard VPN software such as that developed by Microsoft®. The diagnostics policy 118 includes the requirements that the client device 102 must meet to couple to the secure network 112 for data transfers. The diagnostics policy 118 is initially stored on the server 114, but when a client device 102 initiates a connection with the server 114, the diagnostics policy 118 is downloaded to the client device 102.

The client device 102 contains a VPN Client software 104, a diagnostics engine 106 and a diagnostics library 108. In some embodiments, the VPN Client software 104 is part of the standard VPN software such as the software provided by Microsoft®. The diagnostics engine 106 and the diagnostics library 108 operate together with the downloaded diagnostics policy 118. The diagnostics engine 106 implements one or more programs 120 stored within the diagnostics library 108. Based on the diagnostics policy 118, the diagnostics engine 106 determines which programs to run within the diagnostics library 108. After the programs specified by the diagnostics policy 118 are executed, if no issues or errors were found on the client device 102, then the client device 102 is considered sufficiently secure and is given access to the secure network 112. If the client device 102 is missing a required component, then access is denied until either a user corrects the problem or an automatic fix is implemented.

FIG. 2 illustrates an exemplary diagnostics policy 200. Within the diagnostics policy 200 are a set of requirements or objects that the client computer 102 (FIG. 1) must have in order to be permitted to couple to the secure network 112 (FIG. 1). Within the exemplary diagnostics policy 200, the requirements include all security hotfixes, a virus scanner, a spyware scanner, a proper network configuration and a proper hardware configuration. This provides very broad requirements to ensure that the client device 102 (FIG. 1) has some of the basics for security. However, the policy is configurable on the server side, so that it is able to be as general or as specific as desired. As described, the exemplary diagnostics policy 200 is very general. A more specific policy could require that the virus scanner has all updates through the current date or that a certain virus scanner must be implemented such as Norton or McAfee. Even further, a policy could require that the updated virus scanner has actually run a virus scan within the past few days. In some embodiments, the diagnostics policy 200 includes groupings of sub-policies such as virtual private network checks, network checks, system checks, and as shown in FIG. 2, hotfix checks. Other groupings are possible as well. Furthermore, although only a few requirements are included within the exemplary diagnostics policy 200, requirements are able to be added or removed, so that the diagnostics policy 200 requires as much or as little to ensure the client device is secure.

In some embodiments, a diagnostics policy includes different levels of requirements. For example, "crucial," "preferred" and "suggested" are separate levels where "crucial" items are the only requirements that determine if a client device is able to access the secure network, and the "preferred" and "suggested" elements are simply checked for but are not necessary. In addition to checking for the "preferred" and "suggested" elements, a report is issued to the user of the client device regarding the status of the elements, so they are aware of the security of their client device. Then the user is able to take further action if desired. As described above, the diagnostics policy is configured and stored on the server initially, but a copy of it or information relating to the policy is downloaded to the client device when the client device attempts to access the secure network. Once downloaded to the client device, the diagnostics library and diagnostics engine utilize the diagnostics policy to determine which checks to perform.

The diagnostics library is a library of programs related to computer security issues to test computer systems for the existence of security concerns and problems and then to provide remediation solutions for each discovered issue or problem. As described above, security issues relate to virus/spyware scanners, hardware/software configurations, network configurations, operating systems and any other computing concern that is able to compromise system and network security. In some embodiments the diagnostics library is an expert system library.

Each security issue is described discretely within the diagnostics library. The issues, when stored in a format usable by the diagnostics engine on the client device, are able to be processed serially, meaning one problem at a time. In an alternative embodiment, problems are processed in parallel, meaning at the same time. The diagnostics library stores one or more discrete programs for analyzing and handling each discrete issue.

The discrete programs execute desired tasks and are able to remediate certain issues. For example, a function virus_scanner determines if the client device has a virus scanner installed. Furthermore, with additional coding, the function virus_scanner also checks when the virus scanner was last updated to ensure that it is up-to-date. If the virus_scanner function fails, then depending on the desired remedy, either a message is sent to the client device so that the user is able to take appropriate action and/or the virus_scanner function automatically takes the necessary action such as triggering the virus scanner software to retrieve updates.

The diagnostics engine utilizes the diagnostics policy and the discrete programs within the diagnostics library to interrogate the client device for possible security issues. The information obtained by the interrogation is used in conjunction with the diagnostics library and the diagnostics policy to ascertain whether there are problems on the client device and whether the client device is secure enough to access the secure network.

The diagnostics engine uses a scripting language to interact with the diagnostics library. Although very complex tasks are being performed at times, the resultant script language is simplified for easy modification and interoperability. Then, beneath the scripting language is a more complex language which performs the underlying tasks necessary to remedy whatever situation exists. The scripts are generally less complex than the underlying programs to provide simplicity of interaction with the user interface. The underlying programs are necessary to interact with the system's hardware and software, thus need to have the specific abilities to accomplish such tasks. The scripts take the information from the programs and return a condition status. In some embodiments, the condition status is binary-type value such as "true" or "false," "1" or "0" or a similar value. In other embodiments, the condition status is a string, ASCII value or other value representing status.

Contained within the diagnostics library is information describing the resolution of problems. The descriptions range from simple to complex and are able to include a variety of data such as user instructions on problem resolution or scripts which automatically resolve the client device problem. Resolutions include, but are not limited to, adding/removing/updating software, modifying invalid configuration information, installation of patches and others.

FIG. 3 illustrates a flowchart of steps involved in determining if a client device is secure. In the step 300 a client device couples with a VPN server to initiate a network connection. The initial coupling of the client device with the VPN server is sufficient for downloading a diagnostics policy to the client device in the step 302, but not for full data transfers. After the diagnostics policy is received at the client, the diagnostics engine utilizing the diagnostics library is run on the client in the step 304. The diagnostics engine runs one or more tests based on the requirements included in the diagnostics policy. In the step 306, if the diagnostics engine passes all of the tests, then the client device is sufficiently secure, and a network connection between the client device and the private network is established sufficient for data transfers, in the step 308. If the diagnostics engine does not pass the requisite tests in the step 306, then whether autofix is enabled or not in the step 310 determines the next step. If autofix is enabled, then the errors or issues are automatically fixed in the step 312. After the errors or issues are fixed, the network connection is established between the client device and the private network in the step 308. However, if autofix is not enabled, then the user is alerted of the errors or issues in the step 314. Thereafter, the user needs to take appropriate action to put the client device in a position to pass the diagnostics engine's tests by addressing the errors or issues described in the step 314. After the user fixes the issues in the step 316, the client device is able to establish a connection with the private network in the step 308. In some embodiments, even if the errors or issues are automatically fixed, the user is still alerted.

Figure 4:
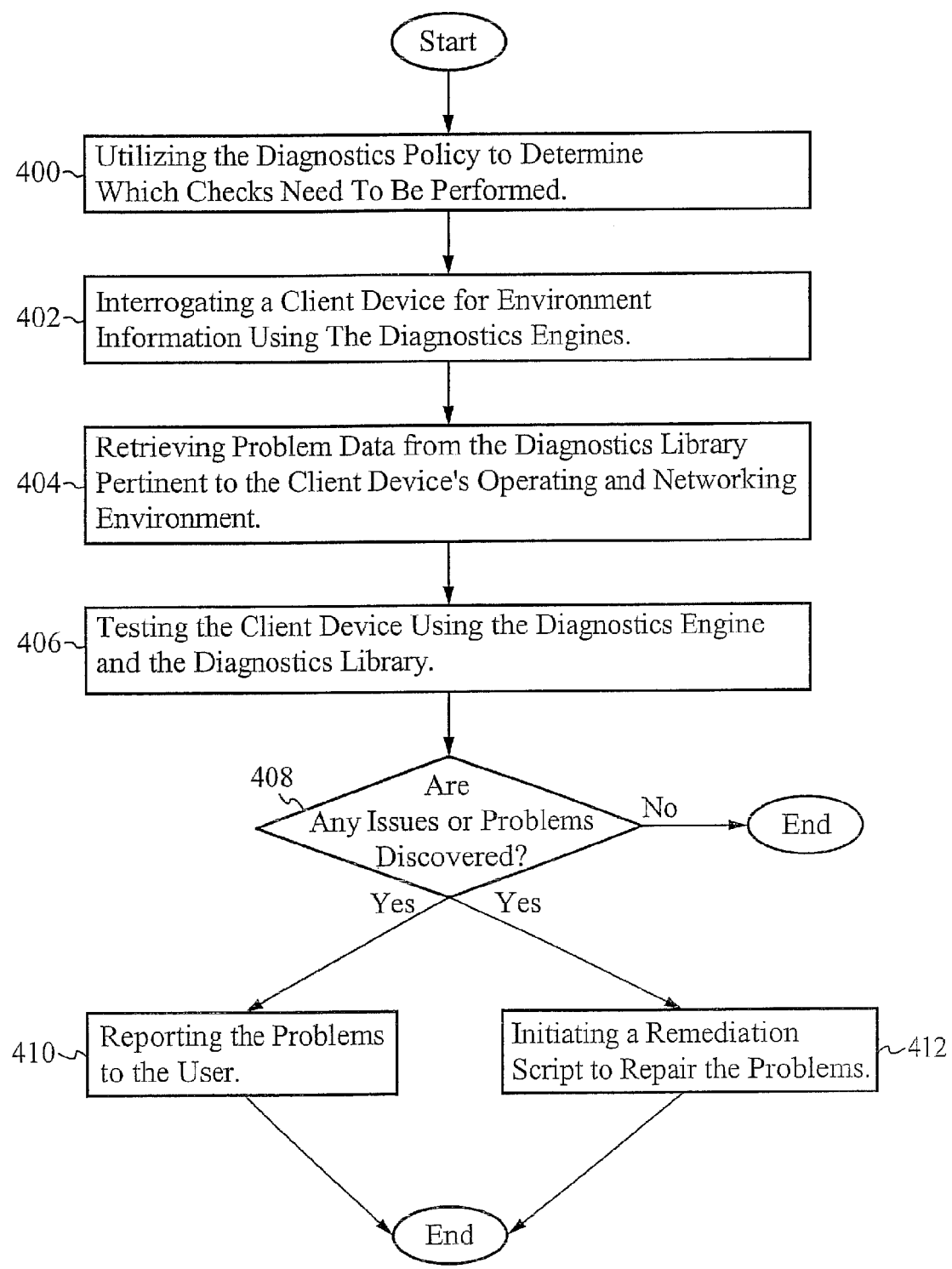
FIG. 4 illustrates a flowchart of the diagnostics policy, engine and library determining whether there are any issues that need to be remedied.

FIG. 4 illustrates a flowchart of the diagnostics policy, engine and library determining whether there are any issues that need to be remedied. At the step 400, the diagnostics engine utilizes the diagnostics policy to determine which checks need to be performed. At the step 402, the diagnostics engine interrogates the client device for the environment information. At the step 404, the diagnostics engine retrieves problem data from the diagnostics library pertinent to the client device's operating and networking environment. For example, if the operating environment is Windows® NT, then problem data related to Windows® NT is retrieved. At the step 406, the diagnostics engine tests the client device using the diagnostics library containing the programs which interact with the client device system. At the step 408, the diagnostics engine determines if there are any issues detected. If the client device does have problems, then the diagnostics engine either reports the problems to the user at the step 410, and/or initiates the remediation script to repair the problem at the step 412.

There are a wide range of problem conditions that the client system is able to detect in the step 410. The following are examples of problem conditions tested by the diagnostics engine that could compromise a system; however, they are not meant to limit the invention in any way. Software is tested for problems such as problematic software patch revisions, incompatible software packages, problematic software installations and problematic software package un/de-installations. The operating system is also checked, such as Windows® registry corruption and existing performance issues. Environmental issues are investigated such as low disk space or hardware errors. Network issues are checked such as interface errors, DNS or IP configuration problems, IP routing failures and ISP network performance. Other important elements of a secure system are investigated such as detecting viruses, driver problems and security vulnerabilities. Any issues that could create system instability and insecurity are also able to be investigated.

Figure 5:
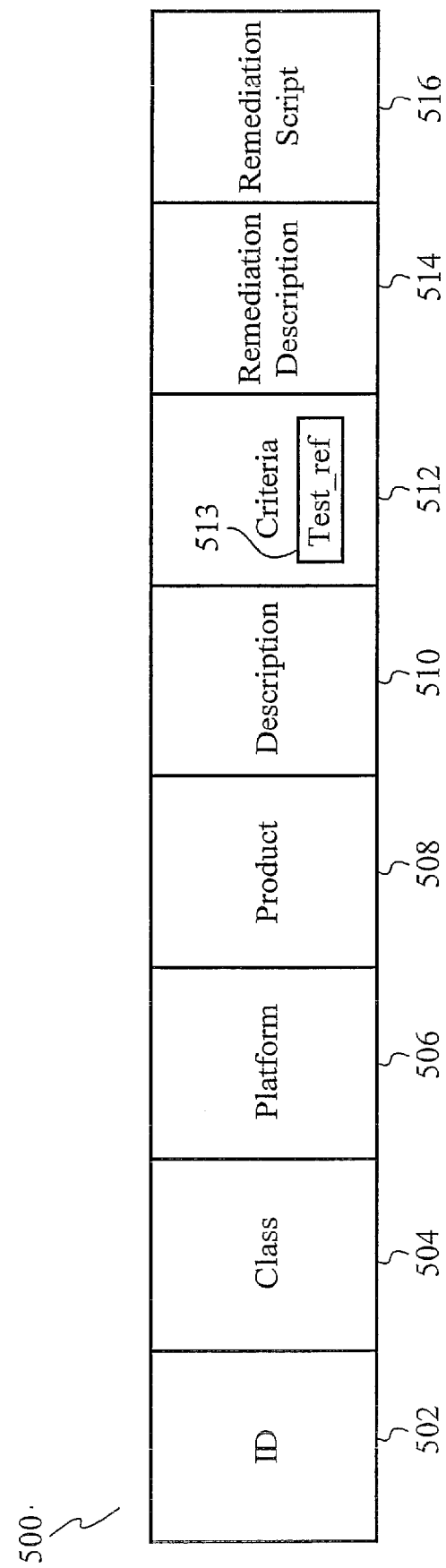
FIG. 5 illustrates an exemplary data structure for the diagnostics library.

FIG. 5 illustrates an example data structure for the diagnostics library. The diagnostics library transfers data structures to the diagnostics engine so that the client device is able to perform checks to determine if there are any problems. The preferred format for the data structures is an embedded language with XML wrapping, although any format is acceptable. The example data structure 500 has the illustrated and described item definitions within it. An ID item 502 stores the test record number. A class item 504 holds the type of test to be performed, such as performance, software patch level, security, virus or software inconsistency. A platform item 506 stores the operating system environment information, for example Windows NT, ME or XP. A product item 508 contains the affected application's information. The product item 508 is a specific component that needs to be investigated such as the Windows Shell or a specified application. A description item 510 stores a detailed description of the problem described. A criteria item 512 holds the subroutine used to identify test criteria. Within the criteria item 512, a test_ref subroutine 513 is used to identify test criteria. Although only one test_ref subroutine 513 is shown in FIG. 5, the criteria item 512 is able to hold a number of test_ref subroutines 513 depending on what test criteria is needed. A remediation description item 514 contains instructions on how to repair the problem described, and a remediation script item 516 stores one or more scripts to automatically remediate the problem described.

FIG. 6 illustrates an example XML coded version of a data structure of the diagnostics library. In the example, the ID item is "5." The platform item is "Windows." Furthermore, the category is "hardware" and the family is "Hardware Management." Hence, the diagnostics engine knows that it needs to investigate issues concerning hardware management of Windows®. Additional items are able to be included in the data structure as well such as a dependency, confidence and health index. The date_created and date_modified items are useful in determining when the data structure was created or modified which helps in the process of problem solving. The description item describes the problem, which in this example, is that the "virus software is not up-to-date." Diagnostic script language is included to determine the status of the hardware or software. Remediation information is used to help resolve the problem, such as a suggestion to "update your virus software." If proper, a remediation script is included to automatically correct the problem. As described above, in the example, the data structure comprises the items required to perform system checks to aid in determining potential conflicts on a user's system. The aforementioned example is not meant to limit the present invention in any way.

The diagnostics engine is client-based software, pre-installed or downloaded onto the client device. The diagnostics engine also interprets the data structure received from the diagnostics library of functions. The functions primarily access information about a user's system or remediate the system. For example, one function is able to query an operating system to determine if it has a certain patch installed, and another function is able to install the patch. The diagnostics engine is also responsible for reporting problems found. Other functions of the diagnostics engine in conjunction with the diagnostics library include, but are not limited to, accessing hardware error counts, reading/writing the Windows® registry, accessing software modules and version/patch levels, moving, copying and removing files from the file system, reading operating system environment such as memory and disk space, updating virtual memory configurations and many other functions to maintain a stable and secure environment.

The diagnostics library utilizes a plug-in architecture. Each diagnostics library record has functionality of a discrete program such that each entry is able to be added to the diagnostics library without affecting the other diagnostics library entries and updated or removed from the diagnostics library with no effect on the other problem records. Such a plug-in architecture allows multiple authors to maintain different problem records independently of simultaneous work being done on other problem records.

The diagnostics library data structure includes procedural language elements including, but not limited to, boolean logic, string manipulation, flow control verbs and simple match functions. The language provides a system interpretation tightly integrated with the operating system. The language is used to create powerful and flexible mechanisms to test for the existence of problem conditions. For example the following language function tests the Windows® registry for the existence of a value:

```
str regvalue
str regkey
regkey =
"\HKEY_LOCAL_MACHINE\SOFTWARE\Microsoft\WindowsNT\CurrentVersion\Hotfix\Q31
2895"
regvalue = F$GETREG(regkey)
if (regvalue != "<error>") then
    return 9 //signal hotfix not installed
else
    return 0 //signal hotfix installed
endif
```

The example language checks if the HotFix (Patch) is installed by analyzing the value of the Windows® registry value at Q312895. If the value is not an error, then the Microsoft® patch is installed. Further, the routine is able to check for one or more code modules which are supposed to be updated by this patch. If the code module version is less than the correct value, then the registry has the patch recorded as installed, but the actual code module could be below the correct value, which would mean the patch was installed but the installation failed.

The language interpreter, part of the diagnostics engine, contains a set of functions which are called the Diagnostics Library Data Language. The functions are specific to operating environments, but operate the same for the Diagnostics Library Data Language. The operating environments where the functions reside could include Microsoft® Windows®, Microsoft® CE, Unix, Linux, handheld operating systems, cell phone operating systems as well as others. The function portability allows the present invention to be implemented across many different platforms.

Since the functions are created in the specific operating system environment, the functions are able to reach into the operating system environments to retrieve specific and detailed data. Examples of such functions include, but are not limited to: Read Windows Registry Value, Check Device Error Counter Values, Check File System Organizations and Structures, Check File Modules and File Version Values, Check for Installation of Specific Applications, Read Environmental Values and Counters, Read Windows Event Log Entries as well as other functions to retrieve specific data.

Figure 7:
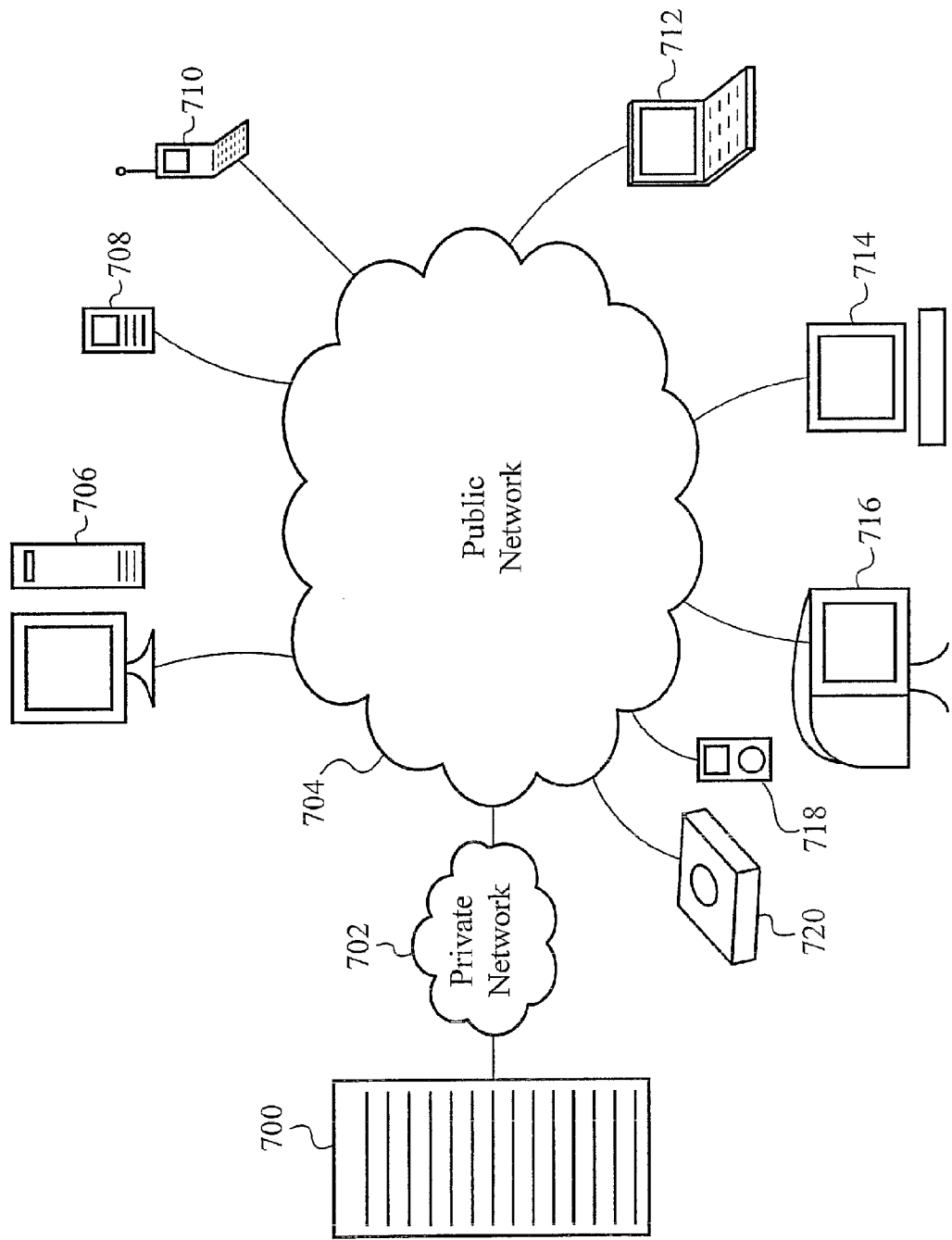
FIG. 7 illustrates a network of devices implementing an embodiment of the present invention.

FIG. 7 illustrates a network implementing an embodiment of the present invention. The present invention allows a network of devices to couple to a VPN. The diagnostics policy is stored on a server 700 within a secure network 702 that is coupled to an unsecure network 704. The coupling across the networks is able to be via networking cables or wireless means. A variety of client devices are able to couple to the secure network 702 through the unsecure network 704. The client devices have the diagnostics engine and diagnostics library stored on them. The client devices include, but are not limited to, a personal computer 706, a PDA 708, a cell phone 710, a laptop computer 712, a thin client 714 or an Apple personal computer 716, an mp3 player 718 and a gaming console 720. Secure devices within the secure network 702 are able to be selected from the same types of devices that are client devices. By utilizing the present invention, users and administrators of the system are able to ensure they are working on a safe and secure environment and when there are undiscovered issues, these issues will be dealt with to maintain the secure environment.

To utilize the present invention, a user with an already secure client device experiences minor differences from a standard connection to a VPN. The minor differences include additional time for verifying that the client device is sufficiently secure. However, since the client device is already secure, lengthy updates and reconfigurations do not occur. If the client device is mostly secure, then the user will experience some delay. Preferably, the process of verifying security is relatively fast to ensure users are not waiting a long time for a connection to be established. If a user has a client device that is deemed unsecure, the engine and library inform the user of the issues and/or automatically remediate the problems. Depending on how extensive the problems are, the process could take a few seconds to many hours. For example, downloading the newest update for a virus scanner would likely take a few minutes, but if a user does not even have a virus scanner nor a spyware scanner, there are network configuration issues and a number of hotfixes are needed for the operating system, the process would be much longer. After the issues are addressed, the client will be sufficiently secure to connect to the VPN without compromising security for the VPN.

In operation, the present invention ensures that a client device is secure when coupling to a VPN. When the client device attempts to establish a connection with the VPN, a policy is downloaded from a server within the VPN to the client device. The policy includes the requirements necessary for the client to be able to couple for data transfer with the VPN. After the policy is downloaded, an engine and a library on the client device implement the policy where the engine takes the policy requirements and runs programs corresponding to the policy within the library. The programs relate to security issues that could compromise the VPN such as determining if a virus scanner is installed and updated. The engine and library continue checking the requirements of the policy and then report the issues discovered. In some embodiments, the library includes automatic remediation scripts to fix the issues automatically. If the engine and library return without any errors or concerns, then the client device passes and is considered secure enough to couple to the VPN for further data transfers and communications.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for providing a secure communications link between a server and a client device over a network comprising:
 a. a diagnostics policy stored on the server, wherein the diagnostics policy comprises data indicating one or more device configurations or components that the client device must have in order to securely couple to the server, and further wherein an initial coupling of the client device with the server is established for downloading the diagnostics policy to the client device;

b. a library stored on the client device for storing information;

c. a diagnostics engine stored on the client device for detecting and resolving one or more issues on the client device; and d. a network communication module for establishing a network connection between the client device and the server over the network, wherein the network communication module with the diagnostics engine prevents communications between the client device and the server unrelated to the diagnostics policy until the one or more issues are resolved by using cryptographic tunneling such that only the diagnostics policy is able to be transferred from the server to the client device.

2. The system as claimed in claim 1 wherein the library is an expert system library.

3. The system as claimed in claim 1 wherein the diagnostics policy is for designating one or more objects to inspect.

4. The system as claimed in claim 1 wherein the diagnostics policy is for determining the requirements needed to be met for a connection to be established.

5. The system as claimed in claim 1 wherein information related to the diagnostics policy is downloaded from the server to the client device.

6. The system as claimed in claim 1 wherein the diagnostics policy contains groupings of sub-policies.

7. The system as claimed in claim 6 wherein the grouping of sub-policies include virtual private network checks, network checks, hotfix checks and system checks.

8. The system as claimed in claim 1 wherein the client device is a selected one of a mobile device and a home user device.

9. The system as claimed in claim 1 wherein the information stored within the library includes one or more programs.

10. The system as claimed in claim 9 wherein the one or more programs stored within the library are wrapped in XML.

11. The system as claimed in claim 1 wherein the diagnostics engine informs a user of the problems if the client device does not pass.

12. The system as claimed in claim 1 wherein the one or more issues discovered by the diagnostics engine are automatically fixed.

13. The system as claimed in claim 1 wherein the diagnostics engine optionally assists in manually fixing the one or more issues discovered by the diagnostics engine.

14. The system as claimed in claim 1 wherein the network is a virtual private network.

15. A system for providing a secure communications link between a server and a client over a network comprising:

a. a diagnostics policy stored on the server wherein the diagnostics policy comprises data indicating a set of requirements that the client device must have in order to be permitted to couple to the server, and further wherein an initial coupling of the client device with the server is established in order to download the diagnostics policy from the server to the client device;

b. an expert system library stored on the client device for storing one or more programs; and c. an diagnostics engine stored on the client device for detecting and resolving one or more issues on the client device;

d. a network communication module for establishing a network connection between the client device and the server over the network, wherein the network communication module with the diagnostics engine prevents communications unrelated to the diagnostics policy between the client device and the server until the one or more issues are resolved by using cryptographic tunneling such that only the diagnostics policy is able to be transferred from the server to the client device.

16. The system as claimed in claim 15 wherein the client device is a selected one of a mobile device and a home user device.

17. The system as claimed in claim 15 wherein the one or more programs stored within the library are wrapped in XML.

18. The system as claimed in claim 15 wherein the diagnostics policy contains groupings of sub-policies.

19. The system as claimed in claim 18 wherein the grouping of sub-policies include virtual private network checks, network checks, hotfix checks and system checks.

20. The system as claimed in claim 15 wherein the diagnostics engine informs a user of the problems if the client device does not pass.

21. The system as claimed in claim 15 wherein the one or more issues discovered by the diagnostics engine are automatically fixed.

22. The system as claimed in claim 15 wherein the diagnostics engine optionally assists in manually fixing the one or more issues discovered by the diagnostics engine.

23. The system as claimed in claim 15 wherein the network is a virtual private network.

24. A method of securing a communications link between a server and a client device over a network comprising:

a. coupling the client device with the server over the network;

b. establishing a limited network connection between the client device and the server, wherein the limited network connection is established for downloading a diagnostics policy to the client device, and further wherein the diagnostics policy comprises data indicating one or more device configurations or components that the client device must have in order to securely couple to the server;

c. preventing communications between the client device and the server unrelated to the diagnostics policy until a secure network connection is established by using cryptographic tunneling such that only the diagnostics policy is able to be transferred from the server to the client device;

d. downloading a diagnostics policy from the server to the client device;

e. running a diagnostics engine utilizing a library on the client device; and f. establishing a secure network connection if the diagnostics engine completes without any issues.

25. The method as claimed in claim 24 wherein the library is an expert system library.

26. The method as claimed in claim 24 further comprising posting a list of issues when the diagnostics engine fails.

27. The method as claimed in claim 24 further comprising automatically fixing the one or more issues when the diagnostics engine fails.

28. The method as claimed in claim 24 wherein the diagnostics engine optionally assists in manually fixing the one or more issues discovered by the diagnostics engine.

29. The method as claimed in claim 27 wherein automatically fixing the one or more issues is selected from the group consisting of downloading applications, downloading application updates, downloading patches, running applications and modifying a registry.

30. The method as claimed in claim 24 further comprising adding custom tools within the library.

31. The method as claimed in claim 24 wherein running the diagnostics engine includes checking for network issues and system issues.

32. The method as claimed in claim 24 wherein the communications link between the server and the client device forms a virtual private network.

33. A network of devices for establishing a secure virtual private network comprising:
   a. a private network containing one or more secure devices, wherein at least one of the one or more secure devices is a server for storing a diagnostics policy, wherein the diagnostics policy comprises data indicating one or more device configurations or components that the client device must have in order to securely couple to the server; and
   b. one or more client devices coupled to the private network through a public network, wherein the one or more client devices contain a diagnostics engine and a diagnostics library, wherein an initial coupling of the one or more client devices with the server is established for downloading the diagnostics policy to the one or more client devices; and
   c. a network communication module for establishing a network connection between the one or more client devices and the server, wherein the network communication module with the diagnostics engine prevents communications between the client device and the server unrelated to the diagnostics policy until any issues detected by the diagnostics engine are resolved by using cryptographic tunneling such that only the diagnostics policy is able to be transferred from the server to the client device.

34. The network of devices as claimed in claim 33 wherein information related to the diagnostics policy is downloaded to the one or more client devices.

35. The network of devices as claimed in claim 33 wherein the one or more client devices are not able to access the private network without being verified using the diagnostics policy, the diagnostics engine and the diagnostics library.

36. The network of devices as claimed in claim 33 wherein the client devices are selected from the group consisting of personal computers, PDAs, cell phones, laptop computers, thin clients and Apple personal computers, mp3 players and gaming consoles.

37. The network of devices as claimed in claim 33 wherein the diagnostics library is an expert system library.

38. The network of devices as claimed in claim 33 wherein the diagnostics policy is for designating one or more objects to inspect.

39. The network of devices as claimed in claim 33 wherein the diagnostics policy is for determining the requirements needed to be met for a connection to be established.

40. The network of devices as claimed in claim 33 wherein the diagnostics policy contains groupings of sub-policies.

41. The network of devices as claimed in claim 40 wherein the grouping of sub-policies include virtual private network checks, network checks, hotfix checks and system checks.

42. The network of devices as claimed in claim 33 wherein the diagnostics library includes one or more programs.

43. The network of devices as claimed in claim 42 wherein the one or more programs stored within the diagnostics library are wrapped in XML.

44. The network of devices as claimed in claim 33 wherein the diagnostics engine informs a user of issues if the client device does not pass.

45. The network of devices as claimed in claim 33 wherein issues discovered by the diagnostics engine are automatically fixed.

46. The network of devices as claimed in claim 33 wherein the diagnostics engine optionally assists in manually fixing issues discovered by the diagnostics engine.

47. A communications apparatus for providing a secure communications link between a server and a client device over a network comprising:
   a. a diagnostics policy stored on the server, wherein the diagnostics policy comprises data indicating one or more device configurations or components that the client device must have in order to securely couple to the server;
   b. a network communication module for establishing an initial coupling of the client device with the server that prevents communications between the client device and the server unrelated to the diagnostics policy by using cryptographic tunneling such that only the diagnostics policy is able to be transferred from the server to the client device.

48. A communications apparatus for providing a secure communications link between a server and a client device over a network comprising:
   a. a diagnostics policy stored on the server comprising data indicating a set of requirements that the client device must have in order to be permitted to couple to the server, wherein an initial coupling of the client device with the server utilizing cryptographic tunneling to only enable the download of the diagnostics policy to the client device;
   b. a library stored on the client device for storing information; and
   c. a diagnostics engine stored on the client device for using the diagnostics policy and the library to detect and resolve one or more issues related to the requirements on the client device, wherein the detecting and resolving of the one or more issues occurs after installation of the diagnostics engine, wherein if the diagnostics engine resolves one or more of the issues, then a secure coupling between the client device and the server sufficient for full data transfers is established over the network.

* * * * *